US012578477B2

(12) United States Patent
Allain et al.

(10) Patent No.: US 12,578,477 B2
(45) Date of Patent: Mar. 17, 2026

(54) METHOD FOR PROCESSING TELEMETRY DATA FOR ESTIMATING A WIND SPEED

(71) Applicant: LEOSPHERE, Paris (FR)

(72) Inventors: Pierre Allain, Paris (FR); Paul Mazoyer, Caen (FR); Laurie Pontreau, Cachan (FR); Peter Rosenbusch, Rueil-Malmaison (FR); Jean-Pierre Cariou, Bures-sur-Yvette (FR)

(73) Assignee: LEOSPHERE, Paris (FR)

( * ) Notice: Subject to any disclaimer, the term of this patent is extended or adjusted under 35 U.S.C. 154(b) by 558 days.

(21) Appl. No.: 17/756,411

(22) PCT Filed: Nov. 20, 2020

(86) PCT No.: PCT/EP2020/082876
§ 371 (c)(1),
(2) Date: May 24, 2022

(87) PCT Pub. No.: WO2021/105020
PCT Pub. Date: Jun. 3, 2021

(65) Prior Publication Data
US 2022/0413158 A1    Dec. 29, 2022

(30) Foreign Application Priority Data
Nov. 25, 2019    (FR) ...................................... 1913192

(51) Int. Cl.
*G01S 17/95* (2006.01)

(52) U.S. Cl.
CPC .................................... *G01S 17/95* (2013.01)

(58) Field of Classification Search
CPC ...... G01S 17/95; G01S 13/951; G01S 13/958; G01S 15/885; G01S 17/58; Y02A 90/10; G01P 5/26
See application file for complete search history.

(56) References Cited

U.S. PATENT DOCUMENTS

| | | | | |
|---|---|---|---|---|
| 7,821,448 | B2 * | 10/2010 | Mahapatra ............ | G01S 13/951 |
| | | | | 342/179 |
| 10,921,444 | B2 * | 2/2021 | Henderson ......... | G01C 21/1652 |
| 2013/0282285 | A1 * | 10/2013 | Boquet ..................... | G01P 5/26 |
| | | | | 702/3 |
| 2019/0293836 | A1 * | 9/2019 | Nabi ........................ | G01P 5/26 |

OTHER PUBLICATIONS

Ashok K. Luhar, "Estimating Variances of Horizontal Wind Fluctuations in Stable Conditions", Boundary Layer Meterol 135, 2010, pp. 301-311.*
Tian Shusen et al., "The calculation algorithm for average wind speed and direction in prediction technology of OTH radar detection range", 2016 CIE International Conference on Radar, IEEE, 2016, pp. 1-4.*

(Continued)

*Primary Examiner* — Alexander Satanovsky
(74) *Attorney, Agent, or Firm* — Greer, Burns & Crain, Ltd

(57) ABSTRACT

A method for processing telemetry data for estimating a wind speed. The method includes a hybridization by temporal combination, and/or by weighting, and/or by averaged projection.

14 Claims, 3 Drawing Sheets

(56) References Cited

OTHER PUBLICATIONS

P. J. M. Clive, "Compensation of vector and vol. averaging bias in lidar wind speed measurements", 14th International Symposium for the Advancement of Boundary Layer Remote Sensing, IOP Conf. Series: Earth and Environmental Science 1 (2008), 10 p, https://iopscience.iop.org/article/10.1088/1755-1315/1/1/012036.*

French Search Report received for Application No. 1913192, dated Jul. 9, 2020.

International Search Report and Written Opinion received for PCT/EP2020/082876, mailed Feb. 18, 2021.

Luhar, A., "Estimating Variances of Horizontal Wind Fluctuations in Stable Conditions," Boundary-Layer Meterol 135, 2010, pp. 301-311.

Tian, S., et al., "The Calculation Algorithm for Average Wind Speed And Direction in Prediction Technology of OTH Radar Detection Range," 2016 CIE International Conference on Radar, IEEE, 2016, 4 pages.

Frørup, U.D., "Editorial: Harnessing the Wind and Charting a Sustainable Course for Shipping," Wind Propulsion, Technology Report, Oct. 2024, pp. 1-34 (19 pages).

Windy Systems Staff, "Conversation with Dominic Champneys," WindCube Scan: Vaisala, Windy Systems Magazine, Nov. 2022, pp. 38-39.

Vaisala, "WindCube Scan Explore Edition, 3D scanning Doppler wind lidar for accurate real-time wind and aerosol backscatter measurements," Vaisala, Product Spotlight, 2022, Ref. B212058EN-C, 2 pages.

Vaisala, "Safeguarding public safety through wind lidars," Vaisala, Case Study, 2024, Ref. B212812EN-B, 2 pages.

Vaisala, "From ports to shipping: Three ways WindCube® lidar is enabling safer, more efficient operations and helping propel the future of cleaner shipping," Vaisala WindCube, Ref. B212663EN-A, 2022, 4 pages.

Vaisala, "Taming the wind: Improve maritime operations with remote wind monitoring," Vaisala, Ref. B212664EN-A, 2022, 16 pages.

Vaisala, "Meeting the wind head on: Using the WindCube Scan to help characterize wind hazards and minimize wind impact on port operations," Vaisala, Case Study, 2020, Ref. B212266EN-A, 2 pages.

Vaisala, "AviMet® Windshear Alert System Increase situational awareness and decrease risk," Vaisala, 2020, Ref. B211840EN-D, 8 pages.

Vaisala, "Pioneering the gold standard in science, innovation and support WindCube: the most trusted wind lidar in the industry," Vaisala, 2023, Ref. B212807EN-A, 14 pages.

Vaisala, "Permanent lidar for wind energy farms: Getting started," Technical Guide, Vaisala, 2024, B212967EN-A Ref. B212967EN-A, 10 pages.

Vaisala, "Permanent lidar for wind energy farms," Solutions Brochure, Vaisala, 2024, Ref. B212890EN-A, 5 pages.

Vaisala, "Hybrid wind reconstruction algorithm: Unique, patented method enables lowest measurement uncertainty," Solution Brief, Vaisala, 2022, Ref. DID65257EN-B, 2 pages.

Vaisala, "WindCube Scan Wind Energy Edition, Long-range, fully customizable measurements for wind farm development and operations," Product Spotlight, Vaisala, 2022, Ref. B211907EN-E, 2 pages.

Vaisala, "2023 WindCube® scientific digest: Get ahead with the latest WindCube wind lidar research," WindCube Lidar, Vaisala, 2023, Ref. B212747EN-A, 2 pages.

Vaisala, "WindCube® Nacelle, New enhancements for unrivaled performance," Vaisala, 2022, Ref. DID68089EN-B, 4 pages.

Vaisala, "WindCube® and WRA, 12 resources for effective operations and insights," WindCube Lidar, Vaisala, 2022, Ref. B212624EN-A, 4 pages.

Vaisala, "WindCube lidar enhancements, Take wind measurements even further with the gold standard in wind lidar," WindCube Lidar, Vaisala, 2022, Ref. B212661EN-A, 3 pages.

Vaisala, "Expand your possibilities With the WindCube® Complex Terrain Ready offering," WindCube Lidar, Vaisala, 2022, Ref. DID66485EN-B, 3 pages.

Vaisala, "Toward new frontiers: How Vaisala wind energy solutions are advancing renewable energy," Vaisala, 2022, Ref. B212492EN-C, 18 pages.

Vaisala, "WindCube Offshore: Floating Lidar System Integration," Solutions Brochure, WindCube Lidar, Vaisala, 2023, Ref. B212753EN-B, 7 pages.

Vaisala, "The offshore frontier, Innovative lidar solutions for offshore wind energy projects," WindCube Lidar, Vaisala, 2022, Ref. B212205EN-C, 10 pages.

Vaisala, "The ultimate guide to WindCube® in complex terrain, Expand your possibilities with world-class technology, best practices, and extensive support," WindCube Lidar, Vaisala, 2022, Ref. DID66484EN-C, 11 pages.

Vaisala, "WindCube lidars for safe airfield operations Protect your pilots & your flight operations from windshear hazards," Product Spotlight, Vaisala, 2022, Ref. B212126EN-B, 2 pages.

Vaisala, "WindCube lidars for artillery test ranges Accurate boundary layer wind data is vital for calculating ballistic trajectories," Product Spotlight, Vaisala, 2022, Ref. B212182EN-B, 2 pages.

Vaisala, "Vaisala WindCube Lidars for UAS Operations Providing accurate, real-time, ground-based wind data aloft for safer and more efficient unmanned aerial operations," Product Spotlight, Vaisala, 2022, Ref. B212437EN-B, 2 pages.

Vaisala, "Windshear in aviation, The ultimate guide to meeting the challenge," Vaisala, 2021, Ref. B212309EN-A, 16 pages.

Vaisala, "WindCube Scan Airport Edition Long-range wind observations for mitigating wind hazards at any airport, in any conditions," Product Spotlight, Vaisala, 2022, Ref. B212629EN-A, 2 pages.

Vaisala, "Atmospheric boundary layer, wind, and air quality: Measurement challenges and real-world impacts," Vaisala, 2020, Ref. B212188EN-A, 13 pages.

Ware, J., et al., "An Analysis of Wind Field Estimation and Exploitation for Quadrotor Flight in the Urban Canopy Layer," 2016 IEEE International Conference on Robotics and Automation (ICRA), Stockholm, Sweden, May 16-21, 2016, pp. 1507-1514.

* cited by examiner

[Fig. 1]
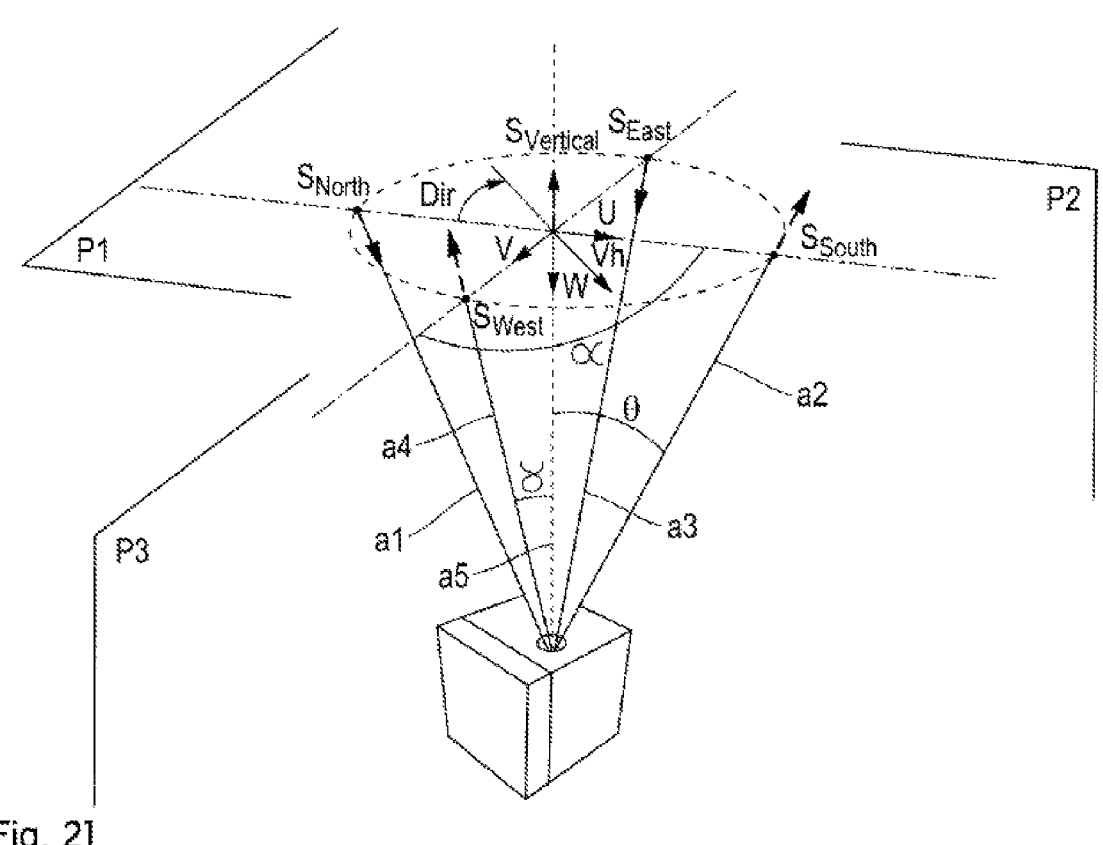
[Fig. 2]
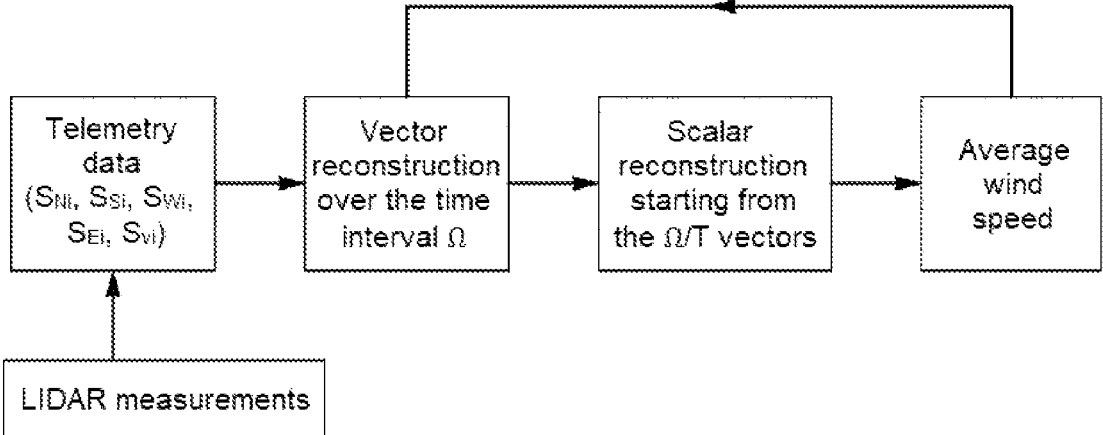

METHOD FOR PROCESSING TELEMETRY DATA FOR ESTIMATING A WIND SPEED

BACKGROUND

The present invention relates to a method for estimating wind speed from telemetry data. The aim of the present invention is in particular to determine wind speed from telemetry data collected by a lidar, radar or sodar system.

The present invention relates to a method based on the reconstruction of average wind speed on the basis of data originating from measurements carried out, sequentially or continuously, at different points in space by a lidar, radar or sodar system.

Methods are known for estimating wind speed by reconstruction of data resulting from measurements carried out by a lidar, radar or sodar system. Two alternative types of reconstruction are found in the state of the art. A first method consists of considering the average wind speed to be equal to the average over a measurement time interval of ten minutes of the norm of the instantaneous wind speed vector. This method is commonly called "scalar method". A second method consists of considering the average wind speed to be equal to the norm of the average wind speed vector over a measurement interval of ten minutes. This method is commonly called "vector method".

When lidar measurements are carried out under conditions of strong atmospheric turbulence, i.e. for which there is considerable variation of wind direction or wind speed in a time interval of 10 minutes, the estimates made by the existing methods differ markedly from the real wind speed. The cup anemometer is regarded as the standard tool for the measurement of wind speed.

In practice, under conditions of low atmospheric turbulence, i.e. for which there are small variations of wind direction or wind speed in a time interval of 10 minutes, the relative error between the wind speed estimated by the methods of the state of the art and the wind speed measured by a cup anemometer is less than 1%. However, under conditions of strong atmospheric turbulence, the relative error between the wind speed estimated by the methods of the state of the art and the wind speed measured by a cup anemometer may reach absolute values of 4%.

It is known in the state of the art that the standard tool for determining wind speed is the cup anemometer. Determination of the wind speed is closely connected with the measurement apparatus used and with the transfer function used for determination.

SUMMARY

The invention aims in particular:

to propose a method for estimating wind speed making it possible to overcome the drawbacks of the methods of the state of the art, and/or to propose a method for estimating wind speed for which the wind speed values determined are as close as possible to the wind speed values measured by a cup anemometer, and/or to propose a method for estimating wind speed for which the error of the wind speed values determined is less than 1% under conditions of strong atmospheric turbulence and under conditions of low atmospheric turbulence, and/or to propose a method for estimating wind speed that is not sensitive to the atmospheric conditions in which the measurements are carried out.

For this purpose, a method is proposed for processing telemetry data for estimating a wind speed.

According to a first alternative, the method comprises hybridization by temporal combination comprising:

a step (A) of vector reconstruction of at least two components of an average wind speed vector over a time interval ($\Omega$), called partition time interval, starting from successive projections, over time, of an instantaneous wind speed vector, a step (B) of scalar reconstruction of at least one average wind speed value ($V_{have}$) over a time interval (T), called reference time interval, starting from a number (T/$\Omega$) of the at least two components of the average wind speed vector reconstructed in step A, 2$\Omega$ is less than or equal to T and T/$\Omega$ corresponds to the number of the at least two components of the average wind speed over the partition time interval $\Omega$ included in the reference time interval T.

The method of hybridization by temporal combination according to the first alternative may comprise:

in step A, reconstruction, on the basis of equations (1) to (7), of the at least two components ($U_\Omega$, $V_\Omega$) or ($V_\Omega$, $W_\Omega$) or ($U_\Omega$, $W_\Omega$) among three components ($U_\Omega$, $V_\Omega$, $W_\Omega$) of the average wind speed vector over the partition time interval $\Omega$; the component $U_\Omega$ being the component of the average wind speed vector in a spatial direction (d1) extending in a spatial plane (p1) and the component $V_\Omega$ being the component of the average wind speed vector in a spatial direction (d2) extending in the spatial plane p1 and the component $W_\Omega$ being the component of the average wind speed vector in a spatial direction (d3) orthogonal to the plane p1:

[Math 1]

$$U_\Omega = \frac{\frac{1}{M} \cdot \sum_M (S_{Ni}) - \frac{1}{M} \cdot \sum_M (S_{Si})}{2 \cdot \sin\theta}, \text{ or} \qquad \text{equation 1}$$

[Math 2]

$$U_\Omega = \frac{\frac{1}{M} \cdot \sum_M (S_{Ni}) - \frac{1}{M} \cdot \sum_M (S_{Si})}{2 \cdot \sin\theta \cdot \cos\left(\frac{\alpha}{2}\right)}, \text{ and/or} \qquad \text{equation 6}$$

[Math 3]

$$V_\Omega = \frac{\frac{1}{M} \cdot \sum_M (S_{Ei}) - \frac{1}{M} \cdot \sum_M (S_{Wi})}{2 \cdot \sin\gamma}, \text{ or} \qquad \text{equation 2}$$

[Math 4]

$$V_\Omega = \frac{\frac{1}{M} \cdot \sum_M (S_{Ei}) - \frac{1}{M} \cdot \sum_M (S_{Wi})}{2 \cdot \sin\gamma \cdot \cos\left(\frac{\alpha}{2}\right)}, \text{ and/or} \qquad \text{equation 7}$$

[Math 5]

$$W_\Omega = \frac{\frac{1}{M} \cdot \sum_M (S_{Ni}) - \frac{1}{M} \cdot \sum_M (S_{Si})}{2 \cdot \cos\theta}, \text{ or} \qquad \text{equation 3}$$

[Math 6]

$$W_\Omega = \frac{\frac{1}{M} \cdot \sum_M (S_{Ei}) - \frac{1}{M} \cdot \sum_M (S_{Wi})}{2 \cdot \cos\gamma}, \text{ or} \qquad \text{equation 4}$$

[Math 7]

$$W_\Omega = \frac{1}{M} \cdot \sum_M (S_{Vi}), \qquad \text{equation 5}$$

in which i is an integer comprised between 1 and M corresponding to the successive projections $S_{Ni}$, $S_{Si}$, $S_{Ei}$, $S_{Wi}$, and $S_{vi}$, over time, of the instantaneous wind speed vector over the partition time interval $\Omega$, $S_{Ni}$, $S_{Si}$, $S_{Ei}$, $S_{Wi}$ and $S_{vi}$ are the respective projections of the instantaneous wind speed vector along, respectively, a first axis (a1), a second axis (a2), a third axis (a3), a fourth axis (a4) and a fifth axis (a5) merged with the direction d3, $\theta$ is a non-zero angle formed between the axis a1 and a normal to the plane p1 and between the axis a2 and the normal to the plane p1 and $\gamma$ is a non-zero angle formed between the axis a3 and the normal to the plane p1 and the axis a4 and the normal to the plane p1, the first and second axes a1 and a2 are included in a plane (p2), the third and fourth axes a3 and a4 are included in a plane (p3) and the planes p2 and p3 form a non-zero angle $\alpha$ between them. Preferably, step A of the method is implemented on the basis of equations 1 to 5 or on the basis of equations 6 and 7.

Furthermore, the method of hybridization by temporal combination according to the first alternative may comprise:

in step B, scalar reconstruction, on the basis of equations (8) to (10) and of the at least two components of the average wind speed vector reconstructed in step A, of the at least one average wind speed value ($Vh_{ave}$) over the reference time interval T in plane p1 or p2 or p3, respectively:

[Math 8]

$$Vh_{ave.1} = \frac{1}{Q} \cdot \sum_{Q} \left( \sqrt{(U_{\Omega})^2 + (V_{\Omega})^2 + 2 \cdot U_{\Omega} \cdot V_{\Omega} \cdot \cos\alpha} \right), \quad \text{equation 8}$$

[Math 9]

$$Vh_{ave.2} = \frac{1}{Q} \cdot \sum_{Q} \left( \sqrt{(U_{\Omega})^2 + (W_{\Omega})^2} \right), \quad \text{equation 9}$$

[Math 10]

$$Vh_{ave.3} = \frac{1}{Q} \cdot \sum_{Q} \left( \sqrt{(V_{\Omega})^2 + (W_{\Omega})^2} \right), \quad \text{equation 10}$$

Q is an integer comprised between 1 and (T/$\Omega$) corresponding to the number of the at least two components of the average wind speed over the partition time interval $\Omega$ included in the reference time interval T.

A value of the partition time interval $\Omega$ may be constant or modified during acquisition of the telemetry data, said value of the partition time interval $\Omega$ being a function of:

the type of telemetry system from which the telemetry data are acquired, and/or the atmospheric conditions during acquisition of said telemetry data.

According to a second alternative, the method comprises hybridization by weighting comprising:

a step (C) of vector reconstruction of at least two components of an instantaneous wind speed vector starting from projections of the instantaneous wind speed vector, a step (D) of vector reconstruction over a time interval (T), called reference time interval, of at least two components of an average wind speed vector starting from a number N of the at least two components, comprised over the reference time interval T, of the instantaneous wind speed vector reconstructed in step C, a step (E) of scalar reconstruction of at least one instantaneous wind speed value starting from the at least two components of the average wind speed vector reconstructed in step C, a step (F) of determining at least one average wind speed value starting from the at least one instantaneous wind speed value reconstructed in step E, a step (G) of determining at least one average wind speed value over the reference time interval T starting from the at least two components of the average wind speed vector reconstructed in step D, a step (H) of determining at least one average wind speed value ($Vh_{ave}$) over the time interval T by weighting of a sum of the at least one average wind speed value reconstructed in step F and at least one average wind speed value determined in step G.

Preferably, the method of hybridization by weighting according to the second alternative may comprise:

in step C, vector reconstruction, on the basis of the respective equations (11) to (17), of the at least two components ($U_i$, $V_i$) or ($V_i$, $W_i$) or ($U_i$, $W_i$) among three components ($U_i$, $V_i$, $W_i$) of the instantaneous wind speed vector; i is an integer comprised between 1 and N corresponding to the number of successive projections of the instantaneous wind speed vector over the reference time interval T, U, being the component of the instantaneous wind speed vector in a spatial direction (d1) extending in a spatial plane (p1) and the component V, being the component of the instantaneous wind speed vector in a spatial direction (d2) extending in the spatial plane p1 and the component W, being the component of the average wind speed vector in a spatial direction (d3) orthogonal to the plane p1:

[Math 11]

$$U_i = \frac{S_{Ni} - S_{Si}}{2 \cdot \sin\theta}, \text{ or} \qquad \text{equation 11}$$

[Math 12]

$$U_i = \frac{S_{Ni} - S_{Si}}{2 \cdot \sin\theta \cdot \cos\left(\frac{\alpha}{2}\right)}, \text{ and/or} \qquad \text{equation 16}$$

[Math 13]

$$V_i = \frac{S_{Ei} - S_{Wi}}{2 \cdot \sin\gamma}, \text{ or} \qquad \text{equation 12}$$

[Math 14]

$$V_i = \frac{S_{Ei} - S_{Wi}}{2 \cdot \sin\gamma \cdot \cos\left(\frac{\alpha}{2}\right)}, \text{ and/or} \qquad \text{equation 17}$$

[Math 15]

$$W_i = \frac{S_{Ei} - S_{Wi}}{2 \cdot \cos\gamma}, \text{ or} \qquad \text{equation 13}$$

[Math 16]

$$W_i = \frac{S_{Ni} - S_{Si}}{2 \cdot \cos\theta}, \text{ or} \qquad \text{equation 14}$$

[Math 17]

$$W_i = S_{Vi}, \qquad \text{equation 15}$$

in which $S_{Ni}$, $S_{Si}$, $S_{Ei}$, $S_{Wi}$ and $S_{Vi}$ are projections of the instantaneous wind speed vector along, respectively, a first axis (a1), a second axis (a2), a third axis (a3), a fourth axis (a4) and a fifth axis (a5) merged with the direction d3, θ is a non-zero angle formed between the axis a1 and a normal to the plane p1 and between the axis a2 and the normal to the plane p1 and γ is a non-zero angle formed between the axis a3 and the normal to the plane p1 and the axis a4 and the normal to the plane p1, the first and second axes a1 and a2 are included in a plane (p2), the third and fourth axes a3 and a4 are included in a plane (p3) and the planes p2 and p3 form a non-zero angle α between them. Preferably, step C of the method is implemented on the basis of equations 11 to 15 or on the basis of equations 16 and 17.

Furthermore, the method of hybridization by temporal combination according to the second alternative may comprise:

in step D, vector reconstruction, on the basis of equations (18) to (20), of the at least two components (Uvect$_N$, Vvect$_N$) or (Vvect$_N$, Wvect$_N$) or (Uvect$_N$, Wvect$_N$) of the average wind speed vector over the reference time interval T; the component Uvect$_N$ being the component of the wind speed in the spatial direction d1, the component Vvect$_N$ being the component of the wind speed in the spatial direction d2 and the component Wvect$_N$ being the component of the wind speed in the spatial direction d3:

[Math 18]

$$Uvect_N = \frac{1}{N} \cdot \sum_N (U_i), \text{ and/or} \qquad \text{equation 18}$$

[Math 19]

$$Vvect_N = \frac{1}{N} \cdot \sum_N (V_i), \text{ and/or} \qquad \text{equation 19}$$

[Math 20]

$$Wvect_N = \frac{1}{N} \cdot \sum_N (W_i), \qquad \text{equation 20}$$

in step E, scalar reconstruction, on the basis of equations (21) to (23), of the at least one value (Vscal$_i$) of the instantaneous wind speed; Vscal$_i$ corresponding to a temporal series of the instantaneous wind speed value in plane p1 or p2 or p3, respectively:

[Math 21]

$$Vscal_{i,1} = \sqrt{(U_i)^2 + (V_i)^2 + 2 \cdot U_i \cdot V_i \cdot \cos\alpha}, \qquad \text{equation 21}$$

[Math 22]

$$Vscal_{i,2} = \sqrt{(U_i)^2 + (W_i)^2}, \qquad \text{equation 22}$$

[Math 23]

$$Vscal_{i,3} = \sqrt{(V_i)^2 + (W_i)^2}, \qquad \text{equation 23,}$$

in step F, determination, on the basis of equations (24) to (26) and starting from the value Vscal$_{i,1}$ or Vscal$_{i,2}$ or Vscal$_{i,3}$ of the instantaneous wind speed reconstructed in step E, of the at least one average wind speed value (Vhscal$_{ave}$) in plane p1, p2 or p3 respectively over the reference time interval T:

[Math 24]

$$Vhscal_{ave.1} = \frac{1}{N} \cdot \sum_N (Vscal_{i,1}), \qquad \text{equation 24}$$

-continued

[Math 25]

$$Vhscal_{ave.2} = \frac{1}{N} \cdot \sum_N (Vscal_{i,2}), \qquad \text{equation 25}$$

[Math 26]

$$Vhscal_{ave.3} = \frac{1}{N} \cdot \sum_N (Vscal_{i,3}), , \qquad \text{equation 26}$$

in step G, determination, on the basis of equations (27) to (29) and starting from the at least two reconstructed components of the average wind speed vector, of the at least one average wind speed value (Vvect$_{ave}$) in plane p1, p2 or p3 respectively over the reference time interval T:

[Math 27]

$$Vhvect_{ave.1} = \frac{}{\sqrt{(Uvect_N)^2 + (Vvect_N)^2 + 2 \cdot Uvect_N \cdot Vvect_N \cdot \cos\alpha}}, \qquad \text{equation 27}$$

[Math 28]

$$Vhvect_{ave.2} = \sqrt{(Uvect_N)^2 + (Wvect_N)^2}, \qquad \text{equation 28}$$

[Math 28]

$$Vhvect_{ave.3} = \sqrt{(Uvect_N)^2 + (Wvect_N)^2}, \qquad \text{equation 29}$$

in step H, calculation, on the basis of equations (30) to (32) and starting from the pairs of reconstructed wind speed values (Vhscal$_{ave.1}$, Vhvect$_{ave.1}$) or (Vhscal$_{ave.2}$ and Vhvect$_{ave.2}$) or (Vhscal$_{ave.3}$, Vhvect$_{ave.3}$), of at least one weighted average wind speed value (Vh$_{ave}$) in plane p1, p2 or p3 respectively over the reference time interval T:

[Math 30]

$$Vh_{ave.1} = (1-P) \cdot Vhscal_{ave.1} + P \cdot Vhvect_{ave.1}, \qquad \text{equation 30}$$

[Math 31]

$$Vh_{ave.2} = (1-P) \cdot Vhscal_{ave.2} + P \cdot Vhvect_{ave.2}, \qquad \text{equation 31}$$

[Math 32]

$$Vh_{ave.3} = (1-P) \cdot Vhscal_{ave.3} + P \cdot Vhvect_{ave.3}, \qquad \text{equation 32}$$

in which P is a dimensionless weighting factor comprised between 0 and 1.

The factor P may be greater than 0.2 and/or less than 0.6, preferably greater than 0.3 and/or less than 0.5, more preferably equal to 0.33.

A value of the factor P may be constant or modified during acquisition of the telemetry data or when implementing the method, said value of the partition time interval Ω being a function of:

the type of telemetry system from which the telemetry data are acquired, and/or the atmospheric conditions during acquisition of said telemetry data.

The method of hybridization by weighting according to the second alternative may comprise an estimation of the fluctuations a of the wind speed over the reference time interval T according to equation (33):

[Math 33]

$$\sigma = c \cdot \sqrt{\frac{|Vhscal_{ave} - Vhvect_{ave}|}{Vh_{ave}}}, \qquad \text{equation 33}$$

in which c is a positive number and a is a zero or positive dimensionless number.

According to a third alternative, the method comprises an averaged projection comprising:

a step (I) of vector reconstruction of at least two components of an instantaneous wind speed vector starting from projections of the instantaneous wind speed vector, a step (J) of determining at least one average wind speed value over the time interval T by projection, over the time interval T, of the at least two components of the instantaneous wind speed vector reconstructed in step I. Preferably, the method of hybridization by averaged projection according to the third alternative may comprise:

in step I, vector reconstruction, on the basis of equations (34) to (40), of the at least two components ($U_i$, $V_i$) or ($V_i$, $W_i$) or ($U_i$, $W_i$) among three components ($U_i$, $V_i$, $W_i$) of the instantaneous wind speed vector; i is an integer comprised between 1 and N corresponding to the number of successive projections of the instantaneous wind speed vector over a time interval (T) called reference time interval, U, being the component of the instantaneous wind speed vector in a spatial direction (d1) extending in a spatial plane (p1), the component V, being the component of the instantaneous wind speed vector in a spatial direction (d2) extending in the spatial plane p1 and the component W, being the component of the average wind speed vector in a spatial direction (d3) orthogonal to the plane p1:

[Math 34]

$$U_i = \frac{S_{Ni} - S_{Si}}{2 \cdot \sin\theta}, \text{ or} \qquad \text{equation 34}$$

[Math 35]

$$U_i = \frac{S_{Ni} - S_{Si}}{2 \cdot \sin\theta \cdot \cos\left(\frac{\alpha}{2}\right)}, \text{ and/or} \qquad \text{equation 39}$$

[Math 36]

$$V_i = \frac{S_{Ei} - S_{Wi}}{2 \cdot \sin\gamma}, \text{ or} \qquad \text{equation 35}$$

[Math 37]

$$V_i = \frac{S_{Ei} - S_{Wi}}{2 \cdot \sin\gamma \cdot \cos\left(\frac{\alpha}{2}\right)}, \text{ and/or} \qquad \text{equation 40}$$

[Math 38]

$$W_i = \frac{S_{Ei} + S_{Wi}}{2 \cdot \cos\gamma}, \text{ or} \qquad \text{equation 36}$$

[Math 39]

$$W_i = \frac{S_{Ni} + S_{Si}}{2 \cdot \cos\theta}, \text{ or} \qquad \text{equation 37}$$

[Math 40]

$$W_i = S_{Vi}, \qquad \text{equation 38}$$

in which $S_{Ni}$, $S_{Si}$, $S_{Ei}$, $S_{Wi}$ and $S_{Vi}$ are projections of the instantaneous wind speed vector along, respectively, a first axis (a1), a second axis (a2), a third axis (a3), a fourth axis (a4) and a fifth axis (a5) merged with the direction d3, $\theta$ is a non-zero angle formed between the axis a1 and a normal to the plane p1 and between the axis a2 and the normal to the plane p1 and $\gamma$ is a non-zero angle formed between the axis a3 and the normal to the plane p1 and the axis a4 and the normal to the plane p1, the first and second axes a1 and a2 are included in a plane (p2), the third and fourth axes a3 and a4 are included in a plane (p3) and the planes p2 and p3 form a non-zero angle $\alpha$ between them. Preferably, step C of the method is implemented on the basis of equations 34 to 38 or on the basis of equations 39 and 40.

Furthermore, the method of hybridization by temporal combination according to the third alternative may comprise:

in step J, determination, on the basis of equations (41) to (42) and starting from the at least two reconstructed components of the instantaneous wind speed vector, of the at least one average wind speed value ($Vh_a$ve) in plane p1, p2 or p3 respectively over the reference time interval T:

[Math 41] \hfill equation 41

$$Vh_{ave.1} = \frac{1}{N-1} \cdot$$
$$\sum_{N-1} \left( \frac{U_{i+1} \cdot U_i + V_{i+1} \cdot V_i + U_{i+1} \cdot V_i \cdot \cos\alpha + V_{i+1} \cdot U_i \cdot \cos\alpha}{\sqrt{(U_i)^2 + (V_i)^2 + 2 \cdot U_i \cdot V_i \cdot \cos\alpha}} \right),$$

[Math 42] \hfill equation 42

$$Vh_{ave.2} = \frac{1}{N-1} \cdot \sum_{N-1} \left( \frac{U_{i+1} \cdot U_i + W_{i+1} \cdot W_i}{\sqrt{(U_i)^2 + (W_i)^2}} \right),$$

[Math 43] \hfill equation 43

$$Vh_{ave.3} = \frac{1}{N-1} \cdot \sum_{N-1} \left( \frac{V_{i+1} \cdot V_i + W_{i+1} \cdot W_i}{\sqrt{(V_i)^2 + (W_i)^2}} \right).$$

The method of hybridization by averaged projection according to the third alternative may comprise an estimation of a wind direction (dir) in plane p1 according to equation (44):

[Math 44]

$$Dir = \tan^{-1}\left(\frac{Vrec}{Urec}\right), \qquad \text{equation 44}$$

in which $\tan^{-1}$ is the arc tangent function, the estimated wind direction is an angular value between the wind direction and the direction d1 and in which Vrec and Urec are each:

a scalar value of a component of the wind speed in plane p1 over the reference time interval T, or an average vector speed of a component of the wind speed in plane p1 over the reference time interval T.

The method according to any one of the first, second and/or third alternatives may comprise a step of measuring the projections $S_{Ni}$, $S_{Si}$, $S_{Ei}$, $S_{Wi}$, and $S_{vi}$ of the instantaneous wind speed vector by means of at least one measuring laser beam extending along each of the respective axes a1, a2, a3, a4 and a5.

The method according to any one of the first, second and/or third alternatives may be implemented by computer.

According to the invention, a data processing device is also proposed comprising means arranged and/or programmed and/or configured for implementing the method according to any one of the first, second and/or third alternatives.

According to the invention, a computer program is also proposed comprising instructions which, when the program is executed by a computer, lead the latter to implement the method according to any one of the first, second and/or third alternatives.

According to the invention, a recording medium is also proposed:

comprising instructions which, when they are executed by a computer, lead to the implementation of the method according to any one of the first, second and/or third alternatives, and/or on which the computer program according to the invention is recorded.

BRIEF DESCRIPTION OF THE DRAWINGS

Other advantages and features of the invention will become apparent on reading the detailed description of implementations and embodiments, which are in no way limitative, and the following attached drawings:

FIG. 1 shows a diagrammatic representation of a slant-wise view of an optical system for the acquisition of telemetry data used for implementing the method according to the invention, FIG. 2 is a functional diagram of a first alternative of the method according to the invention.

DETAILED DESCRIPTION

Figure 3:
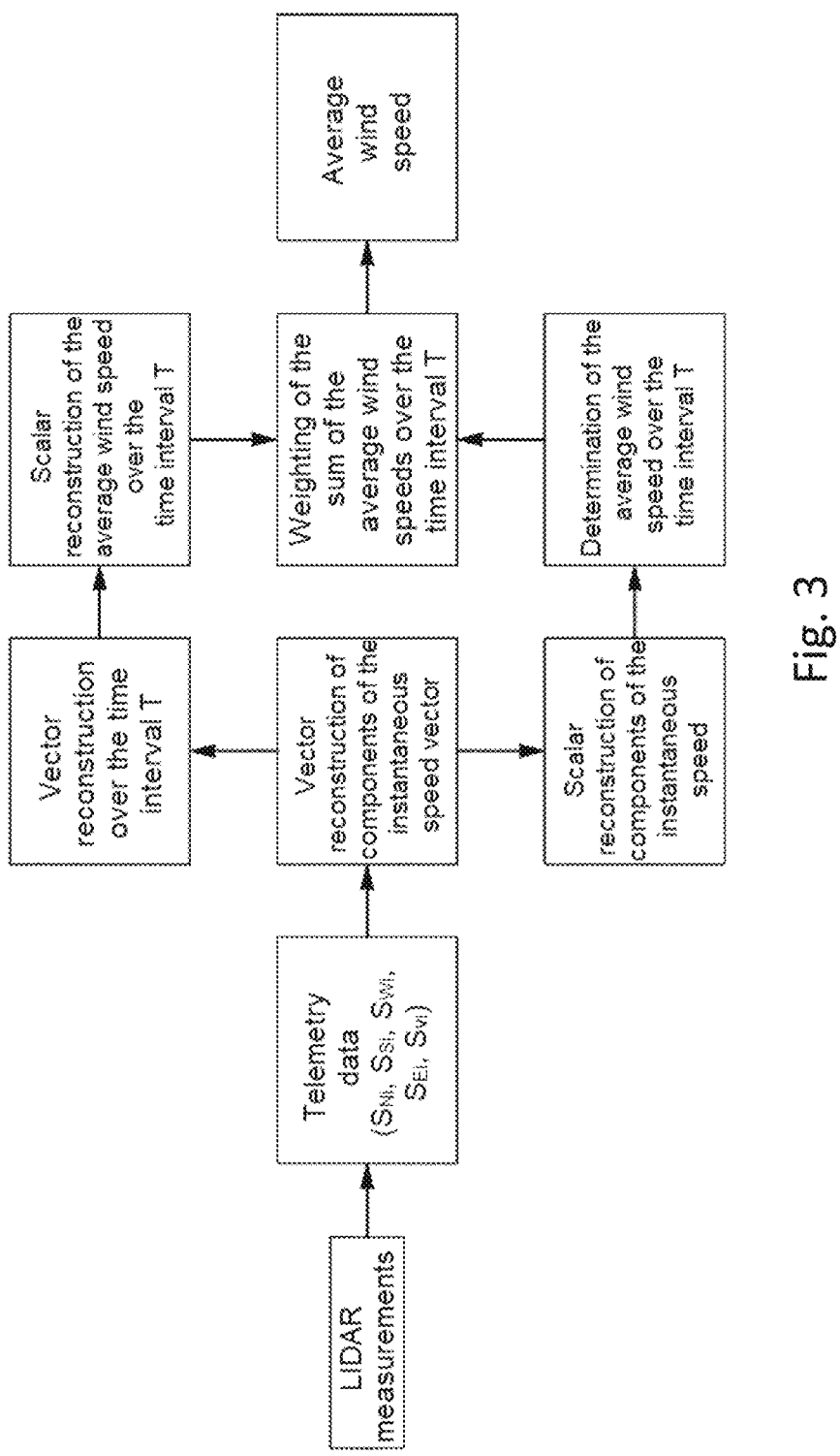
FIG. 3 is a functional diagram of a second alternative of the method according to the invention.

As the embodiments described hereinafter are in no way limitative, it is possible, in particular, to consider variants of the invention comprising only a selection of the characteristics described, in isolation from the other characteristics described (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

FIG. 1 illustrates an example of an optical system 1 for acquiring telemetry data. According to the example in FIG. 1, the optical system 1 emits five optical measurement beams, each extending along a different axis a1, a2, a3, a4 and a5. As a non-limitative example, this system may be a LIDAR of the Lidar type with continuous measurement technology or Lidar with pulsed measurement technology. In this example, it is envisaged to estimate the average wind speed in plane p1. By extension of the method to an additional spatial dimension, a person skilled in the art will also be able to estimate the wind speed in space. According to the example in FIG. 1, axis a5 is vertical, axis a1 is inclined by an angle θ, which here is equal to 28°, relative to axis a5 towards the magnetic north, axis a2 is inclined by an angle θ relative to axis a5 towards the south, axis a3 is inclined by an angle γ, which here is equal to 28°, relative to axis a5 towards the east and axis a4 is inclined by an angle γ relative to axis a5 towards the west. The planes p2 and p3 form an angle α, which here is equal to 90°. In this example, the angle θ formed by axis a1 and axis a2 relative to axis a5 and the angle γ formed by axis a3 and axis a4 relative to axis a5 are identical. A person skilled in the art will also be able to adapt the method according to the invention to the case when these angles are different.

In metrology, wind may be characterized by its direction and its force or magnitude. In practice, wind is defined by a wind vector comprising three components (U, V, W), generally U represents the component of the wind vector along the axis from north to south, V represents the component of the wind vector along the axis from east to west and W represents the component of the wind vector on the axis normal to the surface of the earth at the point of measurement. This wind vector is measured by measuring the velocity of displacement of particles along each of the beams. The instantaneous values measured along each of the beams are projected components $S_{Ni}$, $S_{Si}$, $S_{Ei}$, $S_{Wi}$ and $S_{vi}$ of the wind vector. For this example, the system delivers 5 measurements $S_{Ni}$, $S_{Si}$, $S_{Ei}$, $S_{Wi}$ and $S_{vi}$ every 4 seconds. Thus, a measurement is available about every 0.8 seconds. Over a time interval $\Omega$, there are therefore M, which is equal to division of Q (in seconds) by 4, sets of projected components $S_{Ni}$ $S_{Si}$, $S_{Ei}$, $S_{Wi}$ and $S_{vi}$. It is then necessary to reconstruct the components (U, V, W) of the wind vector from the measured instantaneous projections $S_{Ni}$, $S_{Si}$, $S_{Ei}$, $S_{Wi}$ and $S_{vi}$. In practice, the method for processing telemetry data for estimating a wind speed according to the invention may be implemented on the data measured in real time or on stored data such as measured stored data, statistical data or data that have not been measured (for example data from simulation).

Preferably, the instantaneous wind speed vector, on the basis of which the method for processing telemetry data for estimating a wind speed according to the invention is implemented, is measured by telemetry, for example by a LIDAR. Preferably, the method for processing telemetry data for estimating a wind speed according to the invention is implemented on the data relating to the instantaneous wind speed vector that is measured by telemetry, for example by a LIDAR.

A typical case of use of wind measurement is measurement of the power available for producing wind turbine energy, in this case the measurement interval T is typically a time interval of 10 min, which makes it possible to isolate the energy produced by the wind turbine. This interval is called the reference time interval T. The method for processing telemetry data according to the invention makes it possible to estimate the average wind speed over this reference interval.

According to a particular embodiment of the first alternative of the method according to the invention, the method of hybridization by temporal combination comprises:

in step A, reconstruction, on the basis of equations 1 and 2 and the two components $U_\Omega$, $V_\Omega$ of the wind vector along the north/south and east/west axis respectively, of the average wind speed vector over the partition time interval $\Omega$; the component $U_\Omega$ being the component of the average wind speed vector in a spatial direction d1 corresponding to the north/south axis extending in a spatial plane p1 corresponding to the plane tangential to the surface of the earth at the level of the measurement point and the component $V_\Omega$ being the component of the average wind speed vector in a spatial direction d2 corresponding to the east/west axis extending in the spatial plane p1:

[Math 1]

$$U_\Omega = \frac{\frac{1}{M} \cdot \sum_M (S_{Ni}) - \frac{1}{M} \cdot \sum_M (S_{Si})}{2 \cdot \sin\theta}, \text{ and/or} \qquad \text{equation 1}$$

[Math 3]

$$V_\Omega = \frac{\frac{1}{M} \cdot \sum_M (S_{Ei}) - \frac{1}{M} \cdot \sum_M (S_{Wi})}{2 \cdot \sin\gamma}, \text{ and/or} \qquad \text{equation 2}$$

in which i is an integer comprised between 1 and M, which here is equal to 25, since the partition time interval is 60 seconds and there is a measurement of the 5 projections of the instantaneous wind speed vector every 4 seconds, in step B, scalar reconstruction, on the basis of equation 6 and the two components of the average wind speed vector reconstructed in step A, $U_\Omega$ and $V_\Omega$, of the average value $Vh_{ave}$ of the horizontal wind speed over the reference time interval T in plane p1:

[Math 8]      equation 8

$$Vh_{ave.1} = \frac{1}{Q} \cdot \sum_Q \left( \sqrt{(U_\Omega)^2 + (V_\Omega)^2 + 2.U_\Omega.V_\Omega.\cos(\alpha = 90)} \right) =$$
$$\sqrt{(U_\Omega)^2 + (V_\Omega)^2},$$

Q is equal to T/Ω and corresponds to the number of the components $U_\Omega$ and $V_\Omega$ of the average wind speed over the partition time interval Ω included in the reference time interval T.

In practice, the value of the partition time interval Ω is constant or is modified during acquisition of the telemetry data, said value of the partition time interval Ω being a function of:

the type of telemetry system from which the telemetry data are acquired, and/or the atmospheric conditions during acquisition of said telemetry data.

The value of Ω may be adapted to the amplitude of variation of the direction and of the speed of the horizontal wind, indicated for example by calculating the standard deviation of the direction and the horizontal wind speed, or to the value of the estimated average wind speed.

FIG. 3 shows the functional schematic diagram of the method for processing telemetry data for estimating a wind speed according to a second alternative according to the invention. According to the second alternative, the method comprises hybridization by weighting comprising:

a step C of vector reconstruction of at least two components of an instantaneous wind speed vector from projections of the instantaneous wind speed vector, a step D of vector reconstruction over a time interval T, called reference time interval, of at least two components of an average wind speed vector starting from N, which for a time interval of 10 minutes is 600 seconds and for acquisition of a set of projection of the instantaneous speed vector every 4 seconds is equal to 150, of the two reconstructed components, included over the reference time interval T, of the instantaneous wind speed vector, a step E of scalar reconstruction of at least one average wind speed value over the time interval T starting from the at least two reconstructed components of the average wind speed vector, a step F of determination of at least one value of the norm of the instantaneous wind speed starting from projections of the instantaneous wind speed vector, a step G of determination of at least one average value of the norm of the wind speed over the reference time interval T starting from at least one value of the norm of the reconstructed instantaneous wind speed, a step (H) of determination of at least one average value $Vh_{ave}$ of the wind speed over the time interval T by weighting of a sum of the at least one average wind speed value reconstructed in step E and of the at least one average wind speed value determined in step G.

According to a particular embodiment of the second alternative of the method according to the invention, the method of hybridization by weighting comprises:

in step C, reconstruction, on the basis of the respective equations 11 and 12, of at least two components ($U_i$, V) of an instantaneous wind speed vector along the north/south and east/west axis, respectively; i is an integer comprised between 1 and N corresponding to the number of successive projections of the instantaneous wind speed vector over a time interval T called reference time interval, U, being the component of the instantaneous wind speed vector in a spatial direction d1 corresponding to the north/south axis extending in a spatial plane p1 corresponding to the plane tangential to the surface of the earth at the level of the measurement point and the component V, being the component of the instantaneous wind speed vector in a spatial direction d2 corresponding to the east/west axis extending in the spatial plane p1:

[Math 11]

$$U_i = \frac{S_{Ni} - S_{Si}}{2 \cdot \sin\theta}, \text{ and/or} \qquad \text{equation 11}$$

[Math 13]

$$V_i = \frac{S_{Ei} - S_{Wi}}{2 \cdot \sin\gamma}, \text{ and/or} \qquad \text{equation 12}$$

in step D, reconstruction, on the basis of equations 18 and 19, of the two components ($Uvect_N$, $Vvect_N$) of an average wind speed vector over the reference time interval T along the north/south and east/west axis, respectively; the component $Uvect_N$ being the component of the wind speed in the spatial direction d1 and the component $Vvect_N$ being the component of the wind speed in the spatial direction d2:

[Math 18]

$$Uvect_N = \frac{1}{N} \cdot \sum_N (U_i), \text{ and} \qquad \text{equation 18}$$

[Math 19

$$Vvect_N = \frac{1}{N} \cdot \sum_N (Vi), \text{ and} \qquad \text{equation 19}$$

in step E, reconstruction, on the basis of equation 21, of at least one scalar value ($Vscal_i$) of the instantaneous wind speed; $Vscal_i$ corresponding to a temporal series of the scalar value of the instantaneous wind speed respectively in plane p1:

[Math 21]

equation 21

$$Vscal_{i,1} =$$

$$\sqrt{(U_i)^2 + (V_i)^2 + 2.U_i.V_i.\cos(\alpha = 90)} = \sqrt{(U_i)^2 + (V_i)^2},$$

in step F, calculation, on the basis of equation 24 and starting from the scalar value $Vscal_{i,1}$ of the reconstructed instantaneous wind speed, of the average value $Vhscal_{ave}$ of the norm of the wind speed respectively in plane p1 over the reference time interval T

[Math 24]

equation 24

$$Vhscal_{ave.1} = \frac{1}{N}.\sum_{N}(Vscal_{i,1}),$$

in step G, calculation, on the basis of equation 27 and starting from the two reconstructed components of the average wind speed vector, of the average wind speed value $Vvect_{ave}$ in plane p1 over the reference time interval T:

[Math 27]

equation 27

$$Vhvect_{ave.1} =$$

$$\frac{\sqrt{(Uvect_N)^2 + (Vvect_N)^2 + 2.Uvect_N.Vvect_N.\cos(\alpha = 90)}}{\sqrt{(Uvect_N)^2 + (Vvect_N)^2}},$$

in step H, calculation, on the basis of equation 30 and starting from the pairs of reconstructed wind speed values ($Vhscal_{ave.1}$, $Vhvect_{ave.1}$), of the weighted average wind speed value $V_{have}$ in plane p1 over the reference time interval T:

[Math 30]

$$Vh_{ave.1}=(1-P).Vhscal_{ave.1}+P.Vhvect_{ave.1},$$ equation 30 in which P is a dimensionless weighting factor comprised between 0 and 1.

The optimum value of P depends on:

the type of telemetry system from which the telemetry data are acquired, and/or the atmospheric conditions during acquisition of said telemetry data.

The factor P is greater than 0.2 and/or less than 0.6, preferably greater than 0.3 and/or less than 0.5, more preferably equal to 0.33. Under the standard atmospheric conditions and for the telemetry system with the configuration presented in FIG. 1, the number that makes it possible to obtain the best estimates is approximately 0.33.

The method comprises estimation of the fluctuations a of the wind speed over the reference time interval T according to equation 33:

[Math 33]

equation 33

$$\sigma = c.\sqrt{\frac{|Vhscal_{ave} - Vhvect_{ave}|}{Vh_{ave}}},$$

in which it is a positive number and a is a zero or positive dimensionless number. This estimation is an approximation of the value of the standard deviation of the horizontal speed and of the direction that makes it possible to classify the measured wind flow in categories to be defined as high turbulence or low turbulence.

Figure 4:
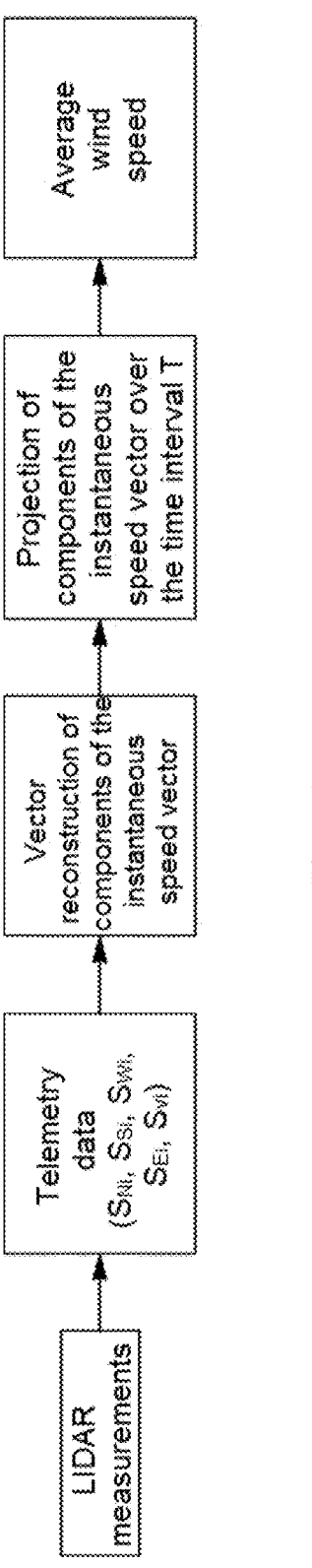
FIG. 4 is a functional diagram of a third alternative of the method according to the invention.

FIG. 4 shows the functional schematic diagram of the method for processing telemetry data for estimating a wind speed according to a third alternative according to the invention. According to the third alternative, the method comprises hybridization by averaged projection comprising:

a step I of vector reconstruction of at least two components of an instantaneous wind speed vector starting from projections of the instantaneous wind speed vector, a step J of determination of at least one average value $V_{have}$ of the wind speed over the time interval T by projection, over the time interval T, of the at least two components of the instantaneous wind speed vector reconstructed in step I.

According to a particular embodiment of the third alternative of the method according to the invention, the method of hybridization by averaged projection comprises:

in step I, vector reconstruction, on the basis of equations 34 and 35, of the two components ($U_i$, V) of the instantaneous wind speed vector along the north/south and east/west axis, respectively; i is an integer comprised between 1 and N corresponding to the number of successive projections of the instantaneous wind speed vector over a time interval T called reference time interval, U, being the component of the instantaneous wind speed vector in a spatial direction d1 corresponding to the north/south axis extending in a spatial plane p1 corresponding to the plane at the surface of the earth at the level of the measurement point and the component V, being the component of the instantaneous wind speed vector in a spatial direction d2 corresponding to the east/west axis extending in the spatial plane p1:

[Math 34]

equation 34

$$U_i = \frac{S_{Ni} - S_{Si}}{2.\sin\theta}, \text{ and/or}$$

[Math 37]

equation 35

$$V_i = \frac{S_{Ei} - S_{Wi}}{2.\sin\gamma}, \text{ and/or}$$

in step J, determination, on the basis of equation 41 and starting from the two reconstructed components of the instantaneous wind speed vector, of the average value $V_{have}$ of the wind speed respectively in plane p1 over the reference time interval T:

[Math 41]

equation 41

$$Vh_{ave.1} =$$

$$\frac{1}{N-1}.\sum_{N-1}\left(\frac{U_{i+1}.U_i + V_{i+1}.V_i + U_{i+1}.V_i.\cos(\alpha = 90) + V_{i+1}.U_i.\cos(\alpha = 90)}{\sqrt{(U_i)^2 + (V_i)^2 + 2.U_i.V_i.\cos(\alpha = 90)}}\right) =$$

$$\frac{1}{N-1}.\sum_{N-1}\left(\frac{U_{i+1}.U_i + V_{i+1}.V_i}{\sqrt{(U_i)^2 + (V_i)^2}}\right),$$

Of course, the invention is not limited to the examples that have just been described, and numerous adjustments may be made to these examples without departing from the scope of the invention. Thus, it is conceivable to combine variants or steps of the embodiments described above.

Moreover, the different characteristics, forms, variants and embodiments of the invention can be combined with one another in various combinations, provided that they are not incompatible or mutually exclusive.

The invention claimed is:

1. A method for processing telemetry data for estimating a wind speed, said method comprising hybridization by temporal combination comprising:

measuring projections $S_{Ni}$, $S_{Si}$, $S_{Ei}$, $S_{Wi}$ and $S_{Vi}$ of an instantaneous wind speed vector along at least one measuring laser beam emitted by a LIDAR; wherein the projections $S_{Ni}$, $S_{Si}$, $S_{Ei}$, $S_{Wi}$ and $S_{Vi}$ of the instantaneous wind speed vector are measured by the LIDAR by means of the at least one measuring laser beam extending, respectively, along a first axis a1, a second axis a2, a third axis a3, a fourth axis a4 and a fifth axis a5;

providing a data processing device configured for receiving said measurements and performing the following steps:

a step (A) of vector reconstruction, on the basis of equations (1) to (7), of at least two components ($U_\Omega$, $V_\Omega$) or ($V_\Omega$, $W_\Omega$) or ($U_\Omega$, $W_\Omega$) among three components ($U_\Omega$, $V_\Omega$, $W_\Omega$) of an average wind speed vector over a time interval ($\Omega$), called partition time interval, from the successive projections, over time, of the instantaneous wind speed vector; the component $U_\Omega$ being the component of the average wind speed vector in a spatial direction (d1) extending in a spatial plane (p1) and the component $V_\Omega$ being the component of the average wind speed vector in a spatial direction (d2) extending in the spatial plane p1 and the component $W_\Omega$ being the component of the average wind speed vector in a spatial direction (d3) orthogonal to the plane p1:

$$U_\Omega = \frac{\frac{1}{M}\cdot\sum_M (S_{Ni}) - \frac{1}{M}\cdot\sum_M (S_{Si})}{2\cdot\sin\theta}, \text{ or} \qquad \text{equation 1}$$

$$U_\Omega = \frac{\frac{1}{M}\cdot\sum_M (S_{Ni}) - \frac{1}{M}\cdot\sum_M (S_{Si})}{2\cdot\sin\theta\cdot\cos\left(\frac{\alpha}{2}\right)}, \text{ and/or} \qquad \text{equation 6}$$

$$V_\Omega = \frac{\frac{1}{M}\cdot\sum_M (S_{Ei}) - \frac{1}{M}\cdot\sum_M (S_{Wi})}{2\cdot\sin\gamma}, \text{ or} \qquad \text{equation 2}$$

$$V_\Omega = \frac{\frac{1}{M}\cdot\sum_M (S_{Ei}) - \frac{1}{M}\cdot\sum_M (S_{Wi})}{2\cdot\sin\gamma\cdot\cos\left(\frac{\alpha}{2}\right)}, \text{ and/or} \qquad \text{equation 7}$$

$$W_\Omega = \frac{\frac{1}{M}\cdot\sum_M (S_{Ni}) + \frac{1}{M}\cdot\sum_M (S_{Si})}{2\cdot\cos\theta}, \text{ or} \qquad \text{equation 3}$$

$$W_\Omega = \frac{\frac{1}{M}\cdot\sum_M (S_{Ei}) + \frac{1}{M}\cdot\sum_M (S_{Wi})}{2\cdot\cos\gamma}, \text{ or} \qquad \text{equation 4}$$

$$W_\Omega = \frac{1}{M}\cdot\sum_M (S_{Vi}), \qquad \text{equation 5}$$

in which i is an integer comprised between 1 and M corresponding to the successive projections $S_{Ni}$, $S_{Si}$, $S_{Ei}$, $S_{Wi}$ and $S_{vi}$, over time, of the instantaneous wind speed vector over the partition time interval $\Omega$;

$S_{Ni}$, $S_{Si}$, $S_{Ei}$, $S_{Wi}$ and $S_{Vi}$ are the respective projections of the instantaneous wind speed vector along, respectively, a first axis (a1), a second axis (a2), a third axis (a3), a fourth axis (a4) and a fifth axis (a5) merged with the direction d3, $\theta$ is a non-zero angle formed between the axis a1 and a normal to the plane p1 and between the axis a2 and the normal to the plane p1 and $\gamma$ is a non-zero angle formed between the axis a3 and the normal to the plane p1 and the axis a4 and the normal to the plane p1, the first and second axes a1 and a2 are included in a plane (p2), the third and fourth axes a3 and a4 are included in a plane (p3) and the planes p2 and p3 form a non-zero angle $\alpha$ between them;

a step (B) of scalar reconstruction, on the basis of equations (8) to (10), of at least one average wind speed value ($Vh_{ave}$) over a time interval (T), in a plane p1 or p2 or p3, called reference time interval, from a T/$\Omega$ of said least two components of the average wind speed vector reconstructed in step A;

wherein T/$\Omega$ corresponds to the number of the at least two components of the average wind speed over the partition time interval $\Omega$ included in the reference time interval T and 2$\Omega$ is less than or equal to T;

wherein:

[Math 8]

$$Vh_{ave.1} = \frac{1}{Q}\cdot\sum_Q \left(\sqrt{(U_\Omega)^2 + (V_\Omega)^2 + 2\cdot U_\Omega\cdot V_\Omega\cdot\cos\alpha}\right), \qquad \text{equation 8}$$

[Math 9]

$$Vh_{ave.2} = \frac{1}{Q}\cdot\sum_Q \left(\sqrt{(U_\Omega)^2 + (W_\Omega)^2}\right), \qquad \text{equation 9}$$

[Math 10]

$$Vh_{ave.3} = \frac{1}{Q}\cdot\sum_Q \left(\sqrt{(V_\Omega)^2 + (W_\Omega)^2}\right), \qquad \text{equation 10;}$$

and

Q is an integer comprised between 1 and (T/$\Omega$) corresponding to the number of the at least two components of the average wind speed over the partition time interval Q included in the reference time interval T.

2. The method according to claim 1, in which a value of the partition time interval $\Omega$ is constant or is modified during acquisition of the telemetry data, said value of the partition time interval $\Omega$ being a function of:

the type of telemetry system from which the telemetry data are acquired, and/or the atmospheric conditions during acquisition of said telemetry data.

3. The method according to claim 1 comprising estimation of a wind direction (dir) in plane p1 according to equation (44):

[Math 44]

$$Dir = \tan^{-1}\left(\frac{Vrec}{Urec}\right), \qquad \text{equation 44}$$

in which $\tan^{-1}$ is the arc tangent function, the estimated wind direction is an angular value between the wind direction and the direction d1 and in which Vrec and Urec are each:

a scalar value of a component of the wind speed in plane p1 over the reference time interval T, or an average vector speed of a component of the wind speed in plane p1 over the reference time interval T.

4. A data processing device comprising means arranged and/or programmed and/or configured for implementing the method according to claim 1.

5. A computer program comprising instructions which, when the program is executed by a computer, lead the latter to implement the method according to claim 1.

6. A recording medium:

comprising instructions which, when they are executed by a computer, on which the computer according to claim 5 is recorded.

7. A recording medium:

comprising instructions which, when they are executed by a computer, lead to implementation of the method according to claim 1.

8. A LIDAR arranged for measuring projections of an instantaneous wind speed vector along at least one measuring laser beam emitted by the LIDAR, and a data processing device, connected with the LIDAR, comprising means arranged and/or programmed and/or configured for implementing the method, according to claim 1, from the projections measured by the LIDAR.

9. A method for processing telemetry data for estimating a wind speed, said method comprising hybridization by weighting comprising:

measuring projections $S_{Ni}$, $S_{Si}$, $S_{Ei}$, $S_{Wi}$ and $S_{Vi}$ of an instantaneous wind speed vector along at least one measuring laser beam emitted by a LIDAR; wherein the projections $S_{Ni}$, $S_{Si}$, $S_{Ei}$, $S_{Wi}$ and $S_{Vi}$ of the instantaneous wind speed vector are measured by the LIDAR, by means of the at least one measuring laser beam extending, respectively, along a first axis a1, a second axis a2, a third axis a3, a fourth axis a4 and a fifth axis a5;

providing a data processing device configured for receiving said measurements and performing the following steps;

a step (C) of vector reconstruction of at least two components of the instantaneous wind speed vector from the projections $S_{Ni}$, $S_{Si}$, $S_{Ei}$, $S_{Wi}$ and $S_{Vi}$ of the instantaneous wind speed vector;

a step (D) of vector reconstruction over a time interval (T), called reference time interval, of at least two components of an average wind speed vector from a number N of the at least two components, comprised over the reference time interval T, of the instantaneous wind speed vector reconstructed in step C;

a step (E) of scalar reconstruction of at least one instantaneous wind speed value from the at least two components of the average wind speed vector reconstructed in step C;

a step (F) of determining at least one average wind speed value from the at least one instantaneous wind speed value reconstructed in step E;

a step (G) of determining at least one average wind speed value over the reference time interval T from the at least two components of the average wind speed vector reconstructed in step D; and a step (H) of determining at least one average wind speed value ($Vh_{ave}$) over the time interval T by weighting of a sum of the at least one average wind speed value reconstructed in step F and of the at least one average wind speed value determined in step G.

10. The method according to claim 9 comprising:

in step C, vector reconstruction, on the basis of the respective equations (11) to (17), of the at least two components $(U_i, V_i)$ or $(V_i, W_i)$ or $(U_i, W_i)$ among three components $(U_i, V_i, W_i)$ of the instantaneous wind speed vector; i is an integer comprised between 1 and N corresponding to the number of successive projections of the instantaneous wind speed vector over the reference time interval T, $U_i$ being the component of the instantaneous wind speed vector in a spatial direction (d1) extending in a spatial plane (p1) and the component $V_i$ being the component of the instantaneous wind speed vector in a spatial direction (d2) extending in the spatial plane p1 and the component $W_i$ being the component of the average wind speed vector in a spatial direction (d3) orthogonal to the plane p1:

[Math 11]
$$U_i = \frac{S_{Ni} - S_{Si}}{2.\sin\theta}, \text{ or} \qquad \text{equation 11}$$

[Math 12]
$$U_i = \frac{S_{Ni} - S_{Si}}{2.\sin\theta.\cos\left(\frac{\alpha}{2}\right)}, \text{ and/or} \qquad \text{equation 16}$$

[Math 13]
$$V_i = \frac{S_{Ei} - S_{Wi}}{2.\sin\gamma}, \text{ or} \qquad \text{equation 12}$$

[Math 14]
$$V_i = \frac{S_{Ei} - S_{Wi}}{2.\sin\gamma.\cos\left(\frac{\alpha}{2}\right)}, \text{ and/or} \qquad \text{equation 17}$$

[Math 15]
$$W_i = \frac{S_{Ei} + S_{Wi}}{2.\cos\gamma}, \text{ or} \qquad \text{equation 13}$$

[Math 16]
$$W_i = \frac{S_{Ni} + S_{Si}}{2.\cos\theta}, \text{ or} \qquad \text{equation 14}$$

[Math 17]
$$W_i = S_{Vi}, \qquad \text{equation 15}$$

in which $S_{Ni}$, $S_{Si}$, $S_{Ei}$, $S_{Wi}$ and $S_{Vi}$ are projections of the instantaneous wind speed vector along, respectively, a first axis (a1), a second axis (a2), a third axis (a3), a fourth axis (a4) and a fifth axis (a5) merged with the direction d3, θ is a non-zero angle formed between the axis a1 and a normal to the plane p1 and between the axis a2 and the normal to the plane p1 and γ is a non-zero angle formed between the axis a3 and the normal to the plane p1 and the axis a4 and the normal to the plane p1, the first and second axes a1 and a2 are included in a plane (p2), the third and fourth axes a3 and a4 are included in a plane (p3) and the planes p2 and p3 form a non-zero angle α between them, in step D, vector reconstruction, on the basis of equations (18) to (20), of the at least two components ($Uvect_N$, $Vvect_N$) or ($Vvect_N$, $Wvect_N$) or ($Uvect_N$, $Wvect_N$) of the average wind speed vector over the reference time interval T; the component $Uvect_N$ being the component of the wind speed in the spatial direction d1, the component $Vvect_N$ being the component of the wind speed in the spatial direction d2 and the component $Wvect_N$ being the component of the wind speed in the spatial direction d3:

[Math 18]

$$Uvect_N = \frac{1}{N} \cdot \sum_N (U_i), \text{ and/or} \qquad \text{equation 18}$$

[Math 19]

$$Vvect_N = \frac{1}{N} \cdot \sum_N (V_i), \text{ and/or} \qquad \text{equation 19}$$

[Math 20]

$$Wvect_N = \frac{1}{N} \cdot \sum_N (W_i), \qquad \text{equation 20}$$

in step E, scalar reconstruction, on the basis of equations (21) to (23), of the at least one value ($Vscal_i$) of the instantaneous wind speed; $Vscal_i$ corresponding to a temporal series of the instantaneous wind speed value in plane p1 or p2 or p3, respectively:

[Math 21]

$$Vscal_{i.1} = \sqrt{(U_i)^2 + (V_i)^2 + 2 \cdot U_i \cdot V_i \cdot \cos\alpha}, \qquad \text{equation 21}$$

[Math 22]

$$Vscal_{i.2} = \sqrt{(U_i)^2 + (W_i)^2}, \qquad \text{equation 22}$$

[Math 23]

$$Vscal_{i.3} = \sqrt{(V_i)^2 + (W_i)^2}, \qquad \text{equation 23,}$$

in step F, determination, on the basis of equations (24) to (26) and starting from the value $Vscal_{i.1}$ or $Vscal_{i.2}$ or $Vscal_{i.3}$ of the instantaneous wind speed reconstructed in step E, of the at least one average wind speed value ($Vhscal_{ave}$) in plane p1, p2 or p3 respectively over the reference time interval T:

[Math 24]

$$Vhscal_{ave.1} = \frac{1}{N} \cdot \sum_N (Vscal_{i.1}), \qquad \text{equation 24}$$

[Math 25]

$$Vhscal_{ave.2} = \frac{1}{N} \cdot \sum_N (Vscal_{i.2}), \qquad \text{equation 25}$$

[Math 26]

$$Vhscal_{ave.3} = \frac{1}{N} \cdot \sum_N (Vscal_{i.3}), \qquad \text{equation 26}$$

in step G, determination, on the basis of equations (27) to (29) and starting from the at least two reconstructed components of the average wind speed vector, of the at least one average wind speed value ($Vvect_{ave}$) in plane p1, p2 or p3 respectively over the reference time interval T:

[Math 27]

$$Vhvect_{ave.1} = \sqrt{(Uvect_N)^2 + (Vvect_N)^2 + 2.Uvect_N.Vvect_N.\cos\alpha}, \qquad \text{equation 27}$$

-continued

[Math 28]

$$Vhvect_{ave.2} = \sqrt{(Uvect_N)^2 + (Wvect_N)^2}, \qquad \text{equation 28}$$

[Math 29]

$$Vhvect_{ave.3} = \sqrt{(Vvect_N)^2 + (Wvect_N)^2}, \qquad \text{equation 29}$$

in step H, calculation, on the basis of equations (30) to (32) and starting from the pairs of reconstructed wind speed values ($Vhscal_{ave.1}$, $Vhvect_{ave.1}$) or ($Vhscal_{ave.2}$ and $Vhvect_{ave.2}$) or ($Vhscal_{ave.3}$, $Vhvect_{ave.3}$), of at least one weighted average wind speed value ($Vh_{ave}$) in plane p1, p2 or p3 respectively over the reference time interval T:

[Math 30]

$$Vh_{ave.1} = (1 - P) \cdot Vhscal_{ave.1} + P \cdot Vhvect_{ave.1}, \qquad \text{equation 30}$$

[Math 31]

$$Vh_{ave.2} = (1 - P) \cdot Vhscal_{ave.2} + P \cdot Vhvect_{ave.2}, \qquad \text{equation 31}$$

[Math 32]

$$Vh_{ave.3} = (1 - P) \cdot Vhscal_{ave.3} + P \cdot Vhvect_{ave.3}, \qquad \text{equation 32}$$

in which P is a dimensionless weighting factor comprised between 0 and 1.

11. The method according to claim 9, in which the factor P is greater than 0.2 and/or less than 0.6.

12. The method according to claim 9, in which the value of the factor P is constant or is modified during acquisition of the telemetry data or when implementing the method, said value of the partition time interval $\Omega$ being a function of:

the type of telemetry system from which the telemetry data are acquired, and/or the atmospheric conditions during acquisition of said telemetry data.

13. The method according to claim 9, comprising estimation of the fluctuations $\sigma$ of the wind speed over the reference time interval T according to equation (33):

[Math 33]

$$\sigma = c \cdot \sqrt{\frac{|Vhscal_{ave} - Vhvect_{ave}|}{Vh_{ave}}} \qquad \text{equation 33}$$

in which c is a positive number and $\sigma$ is a zero or positive dimensionless number.

14. A method for processing telemetry data for estimating a wind speed, said method comprising an averaged projection comprising:

measuring, by a LIDAR, projections $S_{Ni}$, $S_{Si}$, $S_{Ei}$, $S_{Wi}$ and $S_{Vi}$ of an instantaneous wind speed vector along at least one measuring laser beam, emitted by the LIDAR, extending, respectively, along a first axis a1, a second axis a2, a third axis a3, a fourth axis a4 and a fifth axis a5;

providing a data processing device configured for receiving said measurements and performing the following steps:

a step I, of vector reconstruction, of at least two components ($U_i$, $V_i$) or ($V_i$, $W_i$) or ($U_i$, $W_i$) among three components ($U_i$, $V_i$, $W_i$) of the instantaneous wind speed vector from the projections of the instantaneous wind speed vector and from equations (34) to (40); i is an integer comprised between 1 and N corresponding to the number of successive projections of the instantaneous wind speed vector over a time interval (T) called reference time interval, $U_i$ being the component of the instantaneous wind speed vector in a spatial direction (d1) extending in a spatial plane (p1), the component $V_i$ being the component of the instantaneous wind speed vector in a spatial direction (d2) extending in the spatial plane p1 and the component $W_i$ being the component of the average wind speed vector in a spatial direction (d3) orthogonal to the plane p1:

[Math 34]

$$U_i = \frac{S_{Ni} - S_{Si}}{2.\sin\theta}, \text{ or} \qquad \text{equation 34}$$

[Math 35]

$$U_i = \frac{S_{Ni} - S_{Si}}{2.\sin\theta.\cos\left(\frac{\alpha}{2}\right)}, \text{ and/or} \qquad \text{equation 39}$$

[Math 36]

$$V_i = \frac{S_{Ei} - S_{Wi}}{2.\sin\gamma}, \text{ or} \qquad \text{equation 35}$$

[Math 37]

$$V_i = \frac{S_{Ei} - S_{Wi}}{2.\sin\gamma.\cos\left(\frac{\alpha}{2}\right)}, \text{ and/or} \qquad \text{equation 40}$$

[Math 38]

$$W_i = \frac{S_{Ei} + S_{Wi}}{2.\cos\gamma}, \text{ or} \qquad \text{equation 36}$$

[Math 39]

$$W_i = \frac{S_{Ni} + S_{Si}}{2.\cos\theta}, \text{ or} \qquad \text{equation 37}$$

-continued

[Math 40]

$$W_i = S_{Vi}, \qquad \text{equation 38}$$

in which $S_{Ni}$, $S_{Si}$, $S_{Ei}$, $S_{Wi}$ and $S_{Vi}$ are projections of the instantaneous wind speed vector along, respectively, a first axis (a1), a second axis (a2), a third axis (a3), a fourth axis (a4) and a fifth axis (a5) merged with the direction d3, $\theta$ is a non-zero angle formed between the axis a1 and a normal to the plane p1 and between the axis a2 and the normal to the plane p1 and $\gamma$ is a non-zero angle formed between the axis a3 and the normal to the plane p1 and the axis a4 and the normal to the plane p1, the first and second axes a1 and a2 are included in a plane (p2), the third and fourth axes a3 and a4 are included in a plane (p3) and the planes p2 and p3 form a non-zero angle $\alpha$ between them, a step J of determination of at least one average wind speed value ($Vh_{ave}$) in plane p1, p2 or p3 respectively over the reference time interval T, by projection, over the time interval T, on the basis of equations (41) to (43), of the at least two components of the instantaneous wind speed vector reconstructed in step I:

[Math 41]

$$Vh_{ave.1} = \frac{1}{N-1} \cdot \sum_{N-1} \left( \frac{U_{i+1}.U_i + V_{i+1}.V_i + U_{i+1}.V_i.\cos\alpha + V_{i+1}.U_i.\cos\alpha}{\sqrt{(U_i)^2 + (V_i)^2 + 2.U_i.V_i.\cos\alpha}} \right), \qquad \text{equation 41}$$

[Math 42]

$$Vh_{ave.2} = \frac{1}{N-1} \cdot \sum_{N-1} \left( \frac{U_{i+1}.U_i + W_{i+1}.W_i}{\sqrt{(U_i)^2 + (W_i)^2}} \right), \qquad \text{equation 42}$$

[Math 43]

$$Vh_{ave.3} = \frac{1}{N-1} \cdot \sum_{N-1} \left( \frac{V_{i+1}.V_i + W_{i+1}.W_i}{\sqrt{(V_i)^2 + (W_i)^2}} \right), \qquad \text{equation 43}$$

\* \* \* \* \*